Jan. 11, 1949.  W. M. BAUER  2,458,974

METHOD OF AND APPARATUS FOR TESTING IGNITIONS

Filed June 2, 1945  2 Sheets-Sheet 1

INVENTOR.
WILLIAM MALCOLM BAUER
BY Bromley Seeley
ATTORNEY

Jan. 11, 1949.  W. M. BAUER  2,458,974
METHOD OF AND APPARATUS FOR TESTING IGNITIONS
Filed June 2, 1945  2 Sheets-Sheet 2
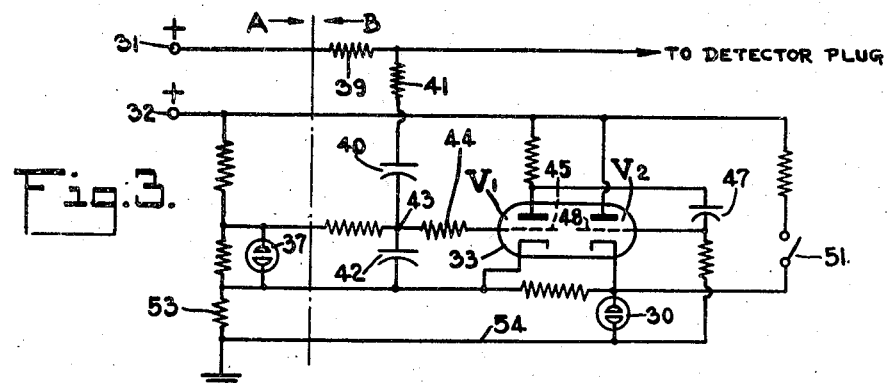
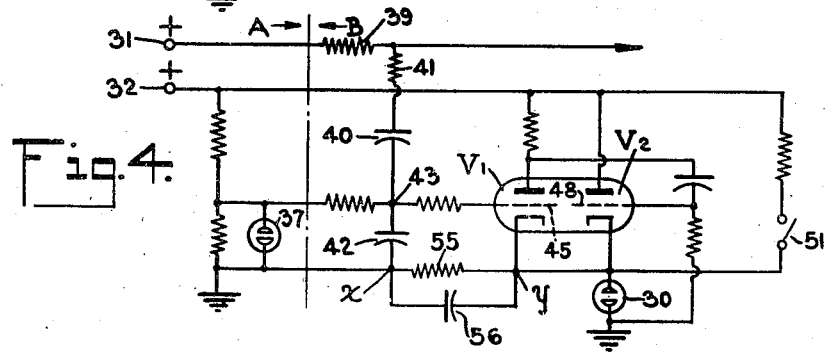
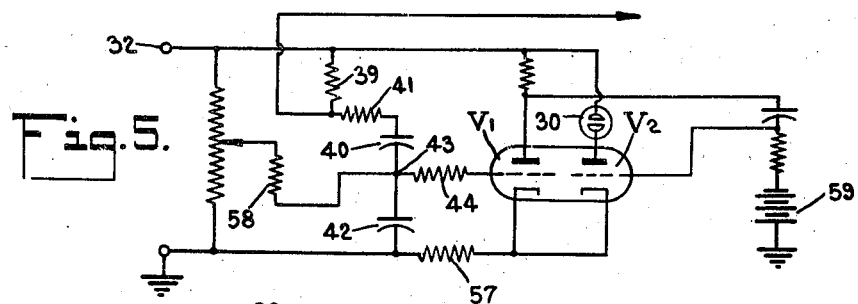
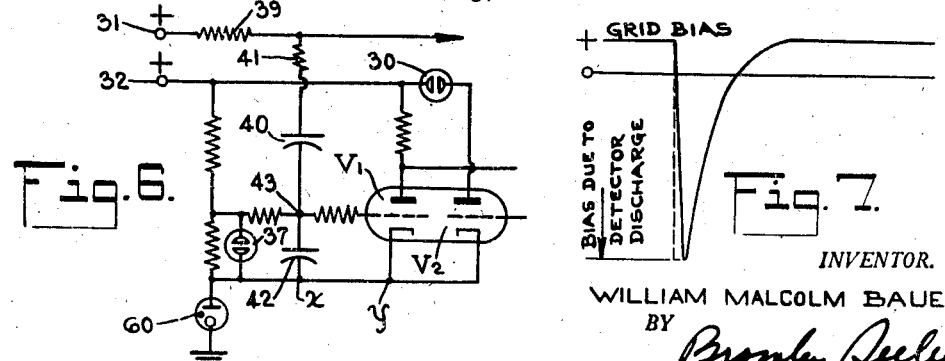
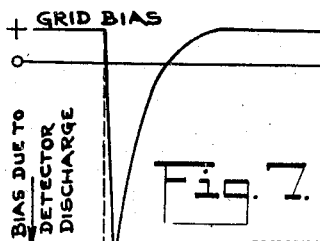
INVENTOR.
WILLIAM MALCOLM BAUER
BY
*Bromley Seeley*
ATTORNEY Patented Jan. 11, 1949

2,458,974

UNITED STATES PATENT OFFICE 2,458,974

METHOD OF AND APPARATUS FOR TESTING IGNITION

William Malcolm Bauer, Glen Ridge, N. J., assignor to Curtiss-Wright Corporation, Bloomfield, N. J., a corporation of Delaware Application June 2, 1945, Serial No. 597,224

16 Claims. (Cl. 175—183)

This invention relates to ignition testing, and particularly to the testing of spark plugs in dual-ignition internal combustion engines, such as aircraft motors, for example.

The servicing of ignition systems of aircraft motors has heretofore consumed a large part of the time required for ground maintenance of large transport and military aircraft. A frequent source of trouble is faulty or fouled spark plugs. In such cases, the conventional method is to remove all plugs from the engine and to replace them with new ones. In the case of an eighteen cylinder motor, for example, this procedure requires approximately twelve man-hours.

A principal object therefore of this invention is to eliminate a considerable part of this loss of time and to enable the ignition system to be quickly and conveniently tested so that faulty plugs can be located at once. Two essential requirements for accurately testing spark plugs for this type of service are that they be tested in the engine under normal operating conditions during which they are subjected to the high temperatures and pressures of the engine cylinders, and also that the accuracy of testing be not affected by interference by induction from nearby high tension conductors of the ignition system.

A further object of this invention is to provide an improved method of and apparatus for testing spark plugs of multiple cylinder, dual-ignition internal combustion engines that does not require removal of the plugs from the engine block during testing and that can be applied during normal operation of the engine.

A further object of this invention is to provide improved means for preventing interference in the testing circuits by induced potentials from high tension conductors of other parts of the ignition system.

A further object of this invention is to provide improved electronic means for giving accurate visual indication of the condition of a spark plug under test.

A further object of this invention is to provide improved testing apparatus for spark plugs in dual-ignition, multiple cylinder internal combustion engines that is efficient and simple in its arrangement so that it can be easily and rapidly applied and used for testing without a separate harness or detector plug system, that provides a very positive visual indication of the condition of the test plug, and that is equally suitable for either ground or flight testing.

In accordance with this invention, the spark plugs of a dual-ignition, multiple cylinder engine are tested one set at a time by operating the engine, first on one magneto only and then on the other, and checking in the respective cylinders the plugs connected to the operating magneto by means of the dead or detector plugs of the inoperative magneto system. To this end, referring to a single cylinder, a potential is applied to a detector plug and electronic means associated therewith is controlled by the conductive condition of said plug during firing of the engine charge by the other twin plug for visually indicating when the live plug is firing.

The invention will be more fully set forth in the following description referring to the accompanying drawings, and the features of novelty will be pointed out with particularity in the claims annexed to and forming a part of this specification.

Referring to the drawings,

Fig. 1 diagrammatically illustrates the application of my invention to a dual-ignition multiple cylinder internal combustion engine;

Figs. 3 and 4 are similar diagrams showing modified forms of circuit arrangements for this purpose;

Fig. 5 is a similar view showing a modified form of circuit arrangement for increasing the duration of the visual indication;

Fig. 6 shows a further modified form of circuit arrangement for obtaining negative bias by means of a voltage regulator tube; and Fig. 7 is an oscillogram illustrating the effect of discharge at the detector plug on grid bias potential.

Figures 1, 2:
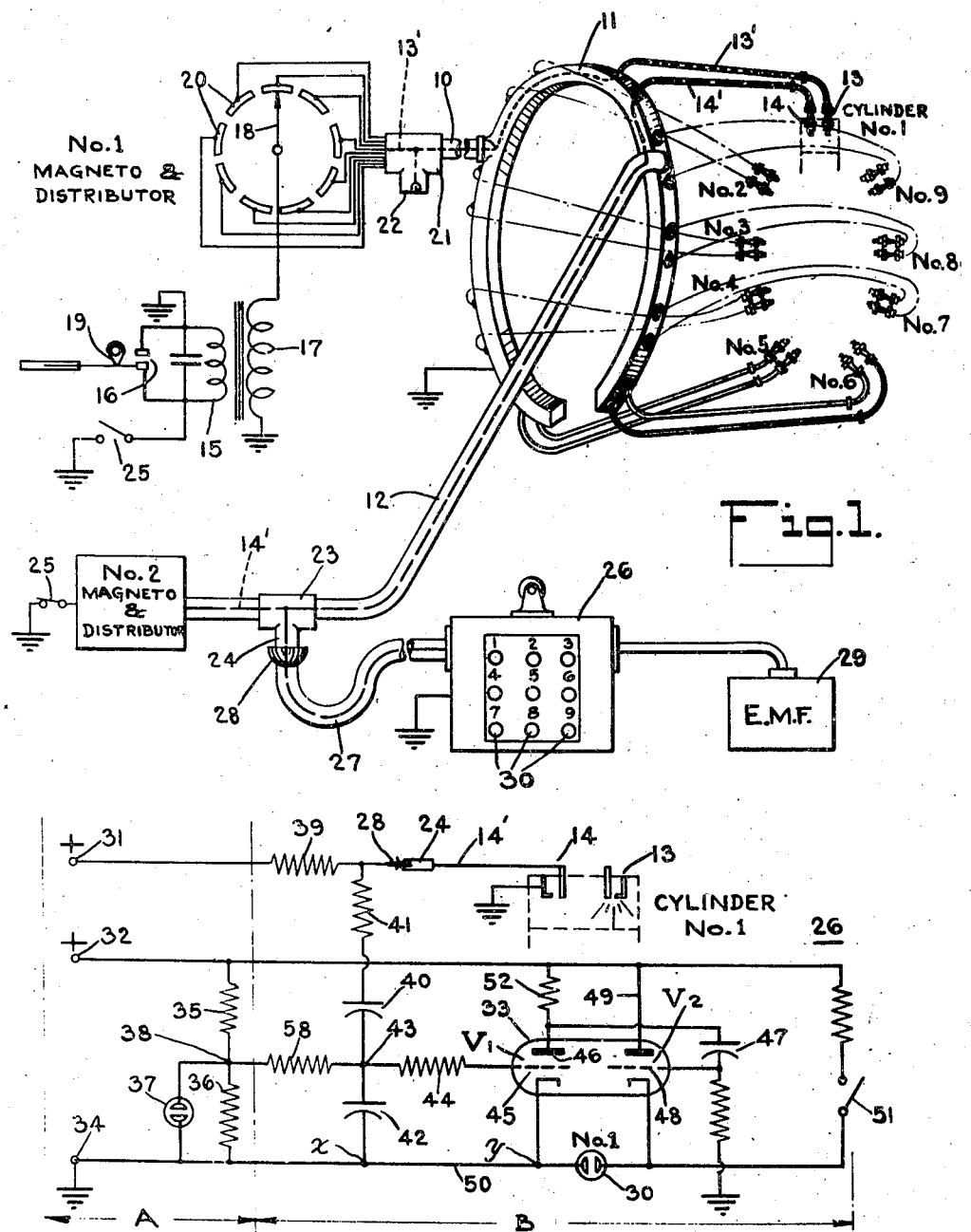
Fig. 2 is a diagram of an electric circuit arrangement including electronic means for visually indicating testing results.

Referring to Fig. 1 there is diagrammatically illustrated a dual-ignition system of a multiple cylinder internal combustion engine of a type commonly used in aircraft. As is well known, a dual-ignition system includes two sets of spark plugs so that each cylinder has two plugs, and a magneto connected to each set of plugs so that the engine can be operated on either magneto if necessary. As illustrated, the No. 1 magneto and distributor is connected by means of a shielded cable 10 to a so-called harness 11 and the No. 2 magneto and distributor is likewise connected by a shielded cable 12 to said harness. The spark plug leads radiate from the harness to the engine cylinders as illustrated, and by way of example the spark plugs 13 and 14 of cylinder No. 1 are shown connected to the spark plug leads or conductors 13' and 14' which are connected to the No. 1 and No. 2 magnetos respectively.

The No. 1 magneto and distributor is diagrammatically illustrated and since it may be of any suitable and conventional type a brief description will be sufficient. The magneto comprises essentially a primary winding 15 that is controlled by the cam operated make-and-break contacts 16, and a secondary winding 17, one terminal of which is grounded and the other terminal connected to the distributor arm 18. The distributor arm 18 and the make-and-break cam 19 are operated by the engine in a well known manner so as to transmit the ignition voltage to the distributor contacts 20 for operation of the spark plugs. The cable 10 for example which includes the conductors from the nine distributor points to the harness leading to the nine cylinders is provided with a junction coupling 21 having an outlet receptacle 22 for each of the nine conductors. The cable 12 of the No. 2 magneto and distributor likewise is provided with a junction coupling 23 having an outlet receptacle 24 for each of the nine conductors in cable 12.

In accordance with my invention the engine is run, while testing, on one ignition system only, such as the No. 1 magneto and distributor and the No. 2 magneto is grounded by the switch 25 so that ignition to No. 2 system is dead. The inactive conductors of cable 12 are then connected to testing apparatus hereinafter described and indicated by way of example by the portable testing unit 26. The unit 26 is provided with a flexible cable 27 having a plug connector 28 for connecting the contacts of the receptacle 24 to corresponding testing conductors of cable 27. As in the case of the cable 12 the cable 27 is shielded such as by means of metallic braid, for example, and the plug and receptacle means 24—28 include well known means for interconnecting the metallic sheathing of the cables. It will be understood that the plug-in arrangement 24—28 is diagrammatically shown and that its particular location depends on practical considerations that may vary with different installations.

The testing unit 26 is preferably portable and is powered for direct current voltage by any convenient source, such as a D. C. battery 29, or commercial A. C. power. There may be incorporated in the unit a vibrator, rectifier, dynamotor, or other suitable means for obtaining a D. C. supply for plate voltage and for ignition detection. The testing unit 26 is also provided with a plurality of indicating lamps 30, each lamp corresponding to a cylinder of the engine.

In brief, the testing of the spark plugs comprises alternately checking one set of plugs against the other during firing or burning of the engine charge. When flame strikes the detector plug, the ionization conductivity permits current to flow and the potential of the plug to drop. This drop in potential is used to flash a neon lamp by means of an electron tube circuit, so that the lamp corresponding to a given cylinder flashes regularly when the active plug is in good condition, and flashes intermittently or remains dark when the plug is faulty or badly fouled. After the plugs connected in No. 1 ignition system have been checked, the testing unit 26 is disconnected from the cable 12, the engine is switched to the No. 2 ignition system and the No. 1 ignition system is made dead by closing its ground switch 25. The testing unit is then connected to cable 10 through the receptacle 22. The spark plugs of No. 1 ignition system now function as detector plugs for the spark plugs of No. 2 ignition system.

Referring specifically to Fig. 2, which shows a one-plug testing circuit of the apparatus 26, the input power terminals 31 and 32 are supplied with positive D. C. potential. Terminal 31, for example, is provided with a suitable voltage, such as 600 volts, and terminal 32 may be provided with 300 volts for the anode bias of electric valve means 33. The terminal 34 is connected to ground and the terminals 32 and 34 are interconnected by two series-connected resistances 35 and 36. An indicating lamp 37, such as a neon lamp, is connected between the terminal 34 and the junction 38 of the aforesaid resistances for indicating whether sufficient power is available for the testing apparatus. If the power supply voltage is insufficient due to a run-down battery or defective power supply the lamp 37 remains dark, indicating that the tester cannot be properly operated. The lamp 37 also functions as a regulator by providing a steady positive bias for the triode valve $V_1$.

The portion of the testing apparatus indicated at A, Fig. 2, is common to the arrangement for testing all cylinders, whereas the part indicated at B is individual to each cylinder. Since but a single electron tube is required for testing each cylinder, the provision of a circuit for each cylinder is preferred, i. e., a tester for a nine cylinder engine would have nine electron tubes and nine indicating lamps as illustrated in Fig. 1. However it will be understood that a single testing circuit used with a selector switch can also be employed to test each cylinder individually. This could be used to advantage for flight testing since the unit would be small and of light weight.

When the testing apparatus is connected through the connectors 24—28 to one of the spark plugs, such as plug 14, for example, a D. C. potential from terminal 31 is impressed across that plug through the resistance 39. This potential also charges the condenser 40 through resistances 39 and 41. Assuming that the plug 13 fires, causing burning of the combustion charge in the cylinder, the flame at plug 14 greatly reduces the di-electric strength of the gap. In this respect the plug 14 is similar to an ionization detector during propagation of flame in the cylinder. When the gap of plug 14 becomes sufficiently conductive, the charged condenser 40 discharges through the plug 14. This discharge in turn charges the condenser 42 in opposition to its normal polarity of charge and thus reverses the normally positive potential of junction 43 that is connected through resistance 44 to the control grid 45 of the valve $V_1$. A typical oscillogram of this variation in potential at the junction 43 is shown by Fig. 7. It will be noted that the grid potential is driven from a positive value to a much greater negative value.

Reversal of the positive grid bias results in cut-off of the valve $V_1$ with the result that the voltage of the anode circuit 46 increases so as to apply through the condenser 47 a positive signal to the control grid 48 of the triode valve $V_2$ which is normally biased to cut-off. This cut-off bias may be automatically provided by the cathode emission of the valve $V_2$ since the cathode of $V_2$ is electrically isolated when the lamp 30 is dark. That is, a blocking charge can build up on the grid 48 due to cathode emission in combination with a high grid resistance. The valve $V_2$ now becomes conducting in response to its positive signal so as to flash an electron indicating lamp 30, such as a neon lamp corresponding to the lamps of the unit 26 in Fig. 1. This flash indicates that the plug 13 has fired the cylinder charge. The lamp circuit includes the anode circuit 49 and return conductor 50.

After the voltage discharge through the detector plug 14, the grid potential of valve $V_1$ relaxes towards its quiescent positive bias as illustrated by Fig. 7 so that the valve again becomes conducting, causing a drop in its plate potential and a corresponding drop in potential at grid 48 of valve $V_2$. The valve $V_2$ is accordingly made non-conducting until the next ignition flame is detected by the plug 14. By providing suitable voltages at the terminals 31 and 32, even a weak detection signal can be relied upon to flash brightly the indicating lamp.

Since the high tension lead to detector plug 14 is located in the same ignition harness with the active high tension leads of the No. 1 magneto, ignition interference may be picked up by the detector lead. This interference is reduced at the junction 43 to a negligible amount by means of the R. C. filter or integrator circuit defined by the resistance 41 and the condenser 42, so that it does not materially affect the grid bias of valve $V_1$.

The capacitance to ground of the leads between the testing apparatus and the engine may also act as a capacitance divider to reduce the strength of the ignition interference. Sufficient positive bias of the valve $V_1$ prevents accidental interference from "triggering" the circuit. Unless the individual leads are separately shielded in the connector cable 27, the mutual capacitance between leads may dissipate the strength of the desired signal and induce a signal which may cause the other channels to be triggered accidentally. The use of individually shielded leads in the flexible cable 27 is therefore preferred.

In certain cases, it may be desirable because of interference difficulties to introduce a slight time delay in the flashing of lamp 30. This can be accomplished by connecting a condenser in parallel with the resistance 52 of the plate circuit of valve $V_1$. When the cut-off of valve $V_1$ takes place, its plate potential rises at a rate determined by the R. C. combination described. This rate can be chosen to introduce a certain time delay that is effective to eliminate interference peaks which otherwise might have gotten below the cut-off point of valve $V_1$.

I have found that the detector plug need not be in perfect condition for detecting proper firing of the active plug on test. In fact I have found that fouled plugs will serve as ignition detectors until they are practically shorted by a bridge of carbon across the electrodes of the plug. Even in case the testing apparatus falsely indicates faulty ignition of the active plug, due to the detector plug being very badly fouled, the apparatus will still definitely indicate faulty ignition in that cylinder since the badly fouled detector plug should be replaced. Also when the test is repeated with interchange of function of the two plugs, the badly fouled plug would in this case fail to give satisfactory ignition, i. e., to fire the cylinder charge. Accordingly, both tests would point to trouble in a particular cylinder, and in such a case both plugs should be replaced.

My improved method of testing is not only accurate but is very positive. It indicates definitely whether a cylinder is or is not firing, even if there is only occasional "missing." The indication is simply the failure of the neon lamp to flash repeatedly so that an experienced operator is not required to interpret the lamp indications. The ignition trouble is accordingly localized in the particular circuit which fails to fire the cylinder charge and in most cases the trouble can be cleared by replacement of the spark plug. If after such replacement trouble still exists in this particular circuit, a standard harness and magneto tester may be used to locate the trouble in this circuit.

As a matter of convenience the testing apparatus may be provided with a so-called "memory" switch 51 that is closed if the lamp 30 indicates faulty ignition. Closing of the switch 51 completes the circuit of the lamp 30 so that it remains lighted after the ignition testing is completed. The memory switch 51 can conveniently be a small toggle switch positioned if desired beside the corresponding indicating lamp.

I have provided alternative arrangements for controlling the electronic means for flashing the indicating lamp in view of the fact that operating conditions may require different circuit characteristics. In the arrangement shown for example in Fig. 3 the cut-off bias of the valve $V_2$ is obtained by means of the resistance 53. When the resistance 53 is carrying a bleeder current and the normal plate currents of the valve $V_1$ it biases the cathode of the valve $V_2$ sufficiently positive to hold the valve at cut-off. In other respects the circuit is essentially the same as that of Fig. 2, the indicating lamp 30 being connected in the load circuit of $V_2$ by conductor 54 so as to flash when valve $V_2$ is conducting, and the power indicating and regulating lamp 37 functioning as in the case of Fig. 2.

Fig. 4 illustrates a basically similar circuit except that in this case the cut-off bias of the valve $V_2$ is obtained by means of a resistance 55. This resistance when carrying the normal load or plate current of the valve $V_1$ biases the cathode of the valve $V_2$ sufficiently positive to maintain the valve at cut-off. By means of resistance 55 I also provide for equalizing the brightness of all flashes of lamp 30 by utilizing the principle of regeneration. The cathode of valve $V_1$ is biased positive while lamp current is traversing the resistance so that the valve $V_1$ is held non-conducting during the flashing signal. A small capacitance 56 is used to prevent transients in the power supply from being introduced between the cathode and grid of $V_1$. The lamps 30 and 37 both function in the manner above described.

In certain cases an unusual amount of interference may be encountered. Since a high positive bias is desirable at the punction 43 to prevent interference from triggering the circuit, and since low positive bias is desirable so that even weak ignition detection signals can trigger the circuit, I provide means for automatically reducing the positive bias when the cylinder is firing. To this end the junction points X and Y may be interconnected by a resistance and condenser in parallel as indicated by Fig. 4. When so applied in the case of Fig. 2, the neon lamp 30 would discharge through the parallel R. C. circuit between X and Y, and develop a steady voltage to reduce the positive bias at V₁. In the case of Fig. 4 the "burning voltage" of lamp 30 provides a higher than normal voltage so as to develop an increased voltage across the R. C. circuit between X and Y.

Fig. 5 shows an arrangement operable at lower voltage for maintaining the brilliance of the flash of the indicating lamp 30 in case the detection signal is comparatively weak by means of regeneration at the cathode of the valve V₁. When the signal lamp 30 is energized by the valve V₂, the lamp current flows through the regenerative resistance 57 thereby producing as previously stated a positive potential at the cathode of the tube V₁. This regenerative feature increases the duration of the flash of lamp 30 and also makes the duration of the flash substantially the same for any irregularity of signal from the detector plug. Thus the brilliance of the flash is increased and made uniform. After the discharge through the plug 14 the grid potential of valve V₁ increases to a value higher than its quiescent bias since the resistances 58 and 44 do not act as a voltage divider while V₁ is non-conducting. The valve V₁ becomes conducting when its grid rises sufficiently positive to cancel the voltage drop of the lamp current flowing in resistance 57. Thus the relaxation of the V₁ grid bias from a large negative signal to a high positive value permits a long and uniform flash from the lamp 30.

After relaxation of junction 43 from the large negative signal, valve V₁ again is made conducting. The saturation value of plate current causes a large decrease of plate potential which impresses a large negative signal on the grid valve V₂. This signal in conjunction with the normal negative bias extinguishes the lamp 30 and holds it non-conducting until the next flame is detected by the plug 14. Likewise during this interim, normal positive quiescent bias of valve V₁ is obtained as the excess positive potential of junction 43 relaxes by virtue of condenser 42 discharging through flow of grid current in valve V₁.

In the circuit of Fig. 5 a D. C. battery 59 is used for providing the normal negative cut-off bias for the valve V₂. It will be noted that the high potential terminal 31 used in the previous circuits is not included. For this reason the circuit of Fig. 5 can use the regenerative feature to particular advantage since weak detection signals might otherwise fail to produce a sufficiently brilliant indication.

Fig. 6 illustrates a further arrangement for obtaining cut-off bias of the valve V₂. A gas filled voltage regulator tube 60 is in this case connected directly from ground to the cathode of the valve V₂. Although in this case the detector lamp current flows through tube 60, the steady voltage bias required is provided by the constant voltage characteristic of the tube.

It will therefore be seen that my invention provides for quick location of a faulty plug circuit so that the removal and replacement of all engine plugs can be avoided, thereby reducing to a large extent station delays due to ignition trouble which is at present responsible for more than half of the station delays.

It should be understood that this invention is not limited to specific details of construction and arrangement thereof herein illustrated, and that changes and modifications may occur to one skilled in the art without departing from the spirit of the invention. For example, although I have shown my invention in its application to a high-tension ignition system, it should be understood that it can also be applied to any ignition system by making suitable connection to a detector plug within the combustion chamber.

I claim:

1. The method of testing the spark plugs of a dual-ignition, multiple cylinder internal combustion engine while in operation which comprises running the engine on the first ignition system only, applying a testing potential to the spark plugs of the second ignition system for detecting faulty plugs in said first system, running the engine on said second ignition system only and applying a testing potential to the spark plugs of said first ignition system for detecting faulty plugs in said second system.

2. The method of testing the spark plugs of a dual-ignition, multiple cylinder internal combustion engine while in operation which comprises running the engine on the first ignition system only, applying a testing potential to the inactive spark plugs of the second ignition system for checking the plugs of said first system by determining the conducting condition of the engine charge, running the engine on said second ignition system only and applying a testing potential to the inactive spark plugs of said first ignition system for checking the plugs of said second system by determining the conducting condition of the engine charge.

3. The method of testing the spark plugs of a dual-ignition, multiple cylinder internal combustion engine while in operation which comprises running the engine on the first ignition system only and applying a testing potential to the inactive spark plugs of the second ignition system, said potential being sufficient to cause voltage break-down of the spark plug gaps only during firing of the engine charge, detecting voltage break-down at said gaps, running the engine on said second ignition system only and applying a similar testing potential to the inactive spark plugs of said first ignition system and detecting voltage break-down at said gaps.

4. The method of testing the spark plugs of a dual-ignition, multiple cylinder internal combustion engine while in operation which comprises running the engine on the first ignition system only and applying a testing potential to the inactive spark plugs of the second ignition system for causing breakdown at the gaps of said plugs during normal firing of the engine charge, detecting for visual indication said normal firing evidenced by breakdown at the respective gaps, running the engine on said second ignition system only and applying a testing potential to the inactive spark plugs of said first ignition system for causing breakdown at the gaps of said plugs during normal firing of the engine charge, and detecting for visual indication said normal firing evidenced by breakdown at the respective gaps.

5. Testing apparatus for a dual-ignition, internal combustion engine adapted to run on either ignition system while the other ignition system is dead comprising means for selectively connecting said apparatus to a dead ignition system of said engine, means for impressing a potential on a spark plug in the dead ignition system so as to cause breakdown at the gap of said plug during normal firing of the engine charge by the twin plug of said other ignition system, electronic means associated with the dead plug and responsive to potential variation caused by the gap breakdown at said plug, and means controlled by said electronic means for indicating said breakdown.

6. Testing apparatus for a dual-ignition, multiple cylinder internal combustion engine adapted to run on either ignition system while the other ignition system is dead comprising means for selectively connecting said apparatus to a dead ignition system of said engine, means for impressing a potential on a spark plug in the dead ignition system so as to cause discharge through said plug during normal firing of the engine charge by the twin plug of said other ignition system, a control circuit including electronic valve means responsive to potential variation caused by discharge of said plug, and an indicating lamp controlled by said electronic means and arranged to be flashed when said engine charge is fired.

7. Testing apparatus for spark plugs of a multiple cylinder internal combustion engine having two spark plugs for each cylinder and a magneto for each set of said plugs, arranged so that the engine can be run on either magneto while the other magneto is dead comprising means for applying a testing potential to each of the plugs connected to the dead magneto, electronic means responsive to the conductive condition of each of said plugs during normal firing of the engine charges by the operating magneto plugs, and means controlled by said electronic means for indicating said normal firing.

8. Testing apparatus for spark plugs of a multiple cylinder internal combustion engine having two spark plugs for each cylinder and a magneto for each set of plugs, arranged so that the engine can be run on either magneto while the other magneto is dead comprising a direct current source, a condenser arranged to be charged from said source for applying a testing potential to a plug connected to the dead magneto, said condenser arranged to discharge through said plug during normal firing of the engine charge by the operating magneto plug, electronic means responsive to the potential drop caused by said condenser discharge, and means controlled by said electronic means for indicating said normal firing.

9. Testing apparatus for spark plugs of a multiple cylinder internal combustion engine having two spark plugs for each cylinder and a magneto for each set of plugs, arranged so that the engine can be run on either magneto while the other magneto is dead comprising means for applying a testing potential to a plug connected to the dead magneto so as to cause current flow through said plug during normal firing of the engine charge by the operating magneto plug, an electronic valve arranged to be biased to cut-off in response to said current flow, a second electronic valve normally biased to cut-off and controlled by said first valve so as to be conducting when said first valve is non-conducting, and means controlled by said second valve for indicating said normal firing.

10. Testing apparatus for a dual-ignition multiple cylinder internal combustion engine adapted to run on either ignition system while the other ignition system is dead comprising a portable unit that can be selectively connected to a dead ignition system of said engine, said unit having a source of D. C. potential and comprising a testing circuit for each cylinder of said engine, each circuit having a condenser arranged to be charged by said potential so as to be impressed on a spark plug of the corresponding cylinder in the dead ignition system so as to cause discharge through said plug during normal firing of the engine charge by the twin plug of said other ignition system, valve biasing means responsive to said discharge, an electronic valve normally biased to cut-off and controlled by said biasing means so as to be conducting during said discharge, and a lamp operatively connected to said valve for indicating said discharge and normal firing.

11. Testing apparatus for spark plugs of an internal combustion engine having a detector in the cylinder of the plug being tested, comprising a control circuit including a condenser for applying a testing potential to said detector, an electron valve having a control grid, means controlled by the conductive condition of said detector during the condenser discharge incident to normal firing of the engine charge for increasing the grid potential of said valve so that it becomes conducting, and a lamp controlled by said electron valve for indicating said normal firing.

12. Testing apparatus for detecting a sudden increase in conductivity of a circuit comprising a condenser arranged to be charged by a D. C. potential, means connecting said condenser to said circuit so that the condenser discharges through said circuit in accordance with a sudden predetermined increase in conductivity of said circuit, an electron valve having a control grid, means responsive to potential variation incident to discharge of said condenser for increasing the control potential of said valve so that it becomes conducting, and an electron lamp for indicating the aforesaid increases in conductivity when said valve becomes conducting, said lamp being connected in the cathode circuit of said valve so as normally to isolate said cathode and to cause an increase in cathode potential due to cathode emission for normally biasing said valve to cut-off.

13. Control apparatus comprising a circuit including a pair of electron valves each having a control grid, said valves being arranged so that biasing of the first valve to cut-off causes the second valve to become conductive, an electron lamp in the load circuit of said second valve for indicating conduction of said valve, and a parallel connected resistance and condenser electrically connected to the control grid of said first valve and arranged to be charged by said electron lamp whereby the potential on said control grid is lowered during a rapidly recurring cycle of operation of said valves and is permitted to increase when said valves are quiescent to prevent accidental cut-off of said first valve and triggering of said circuit by interference.

14. Testing apparatus for the spark plugs of a dual-ignition internal combustion engine adapted to run on either ignition system comprising means adapted to be selectively connected to a dead ignition system while the other system is operating for impressing a testing potential on a spark plug of the dead system, said potential causing flow of current through the spark gap at said plug when the cylinder charge is normally fired by the corresponding plug of the operating system, and means controlled by said current flow for indicating said normal firing.

15. Testing apparatus for the spark plugs of a dual-ignition internal combustion engine adapted to run on either ignition system comprising a condenser subject to a charging potential, means adapted to be selectively connected to a dead ignition system while the other system is operating for impressing the condenser charge on a spark plug of the dead system, said charge causing flow of current through the spark gap at said plug when the cylinder charge is normally fired by the corresponding plug of the operating system, and electronic valve means controlled by said current flow for indicating said normal firing.

16. A spark plug tester for indicating normal firing under load conditions within an internal combustion engine comprising means apart from the plug to be tested for detecting ionized combustion gases incident to firing of the cylinder charge by said plug, and an indicating device, said detecting means including electronic valve means for controlling said indicating device.

WILLIAM MALCOLM BAUER.

REFERENCES CITED

The following references are of record in the file of this patent:

UNITED STATES PATENTS

| Number | Name | Date |
| --- | --- | --- |
| 2,324,458 | Peters | July 13, 1943 |
| 2,335,780 | McCoy | Nov. 30, 1943 |
| 2,381,609 | McCoy | Aug. 7, 1945 |
| 2,385,976 | Evans | Oct. 2, 1945 |
| 2,400,069 | Blosser | May 14, 1946 |
| 2,405,843 | Moe | Aug. 13, 1946 |
| 2,406,096 | Morrison | Aug. 20, 1946 |
| 2,411,062 | Schade | Nov. 12, 1946 |